(12) United States Patent
Hardegger et al.

(10) Patent No.: US 11,262,475 B2
(45) Date of Patent: Mar. 1, 2022

(54) OPTOELECTRONIC SENSOR HAVING PLUG-IN UNIT FOR PROVIDING EXTENDED FUNCTIONALITY

(71) Applicant: ROCKWELL AUTOMATION SWITZERLAND GMBH, Aarau (CH)

(72) Inventors: Martin Hardegger, Sargans (CH); Norbert Manfred Stein, Domat/Ems (CH); Suresh R. Nair, Amherst, NH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 112 days.

(21) Appl. No.: 16/140,793

(22) Filed: Sep. 25, 2018

(65) Prior Publication Data

US 2019/0094412 A1 Mar. 28, 2019

(30) Foreign Application Priority Data

Sep. 27, 2017 (EP) .................................. 17193368

(51) Int. Cl.
*G06M 7/00* (2006.01)
*G01V 8/20* (2006.01)
(Continued)

(52) U.S. Cl.
CPC .............. *G01V 8/20* (2013.01); *G08B 13/186* (2013.01); *G08B 25/08* (2013.01); *G08B 29/04* (2013.01); *F16P 3/144* (2013.01)

(58) Field of Classification Search
CPC ...... G08B 29/04; G08B 25/08; G08B 13/186; G01V 8/20
(Continued)

(56) References Cited

U.S. PATENT DOCUMENTS 4,742,377 A * 5/1988 Einthoven ............. H01L 29/872
257/484
6,469,623 B2 10/2002 Pattok et al.
(Continued)

FOREIGN PATENT DOCUMENTS

DE 29900149 U1 3/1999
DE 102007055521 A1 6/2009
(Continued)

OTHER PUBLICATIONS

Extended European Search Report dated Mar. 15, 2018; Application No. 17193368.2—(11) pages.
(Continued)

*Primary Examiner* — Georgia Y Epps

(57) ABSTRACT

The present invention relates to an optoelectronic sensor used with light curtains for monitoring a sensing field. The optoelectronic sensor includes at least one optical unit having at least one radiation emitting element and at least one radiation receiving element and a control unit for processing an output signal generated by said radiation receiving element and for generating a defined sensor signal based on the output signal. The optical unit has a diagnostic unit including a monitoring unit operable to monitor at least one parameter indicative of an operational status of the optical unit. The diagnostic unit includes a processing unit operable to generate a communication signal indicative of said operational status, and the diagnostic unit is arranged in a separately housed, detachable plug-in module. The processing unit comprises a wireless communication interface for wirelessly receiving and transmitting communication signals.

20 Claims, 9 Drawing Sheets

(51) Int. Cl.
  *G08B 29/04* (2006.01)
  *G08B 13/186* (2006.01)
  *G08B 25/08* (2006.01)
  *F16P 3/14* (2006.01)

(58) Field of Classification Search
  USPC .......................................................... 250/221
  See application file for complete search history.

(56) References Cited

U.S. PATENT DOCUMENTS

| | | | |
|---|---|---|---|
| 8,230,276 B2* | 7/2012 | Chiras | G11C 13/0069 |
| | | | 714/719 |
| 8,436,290 B2 | 5/2013 | Klingelhofer | |
| 8,644,172 B2* | 2/2014 | Hinderthuer | H04Q 11/0005 |
| | | | 370/241 |
| 9,609,399 B2 | 3/2017 | Krishnamurthy et al. | |
| 9,761,113 B1* | 9/2017 | Gelineau | G08B 21/22 |
| 2010/0127158 A1* | 5/2010 | Scheiber | F16P 3/144 |
| | | | 250/208.1 |
| 2015/0045914 A1* | 2/2015 | Saumer | G05B 9/02 |
| | | | 700/79 |
| 2015/0243155 A1 | 8/2015 | Xiong et al. | |
| 2017/0146687 A1 | 5/2017 | Gelineau et al. | |
| 2018/0013259 A1* | 1/2018 | Takigawa | H01S 5/0683 |

FOREIGN PATENT DOCUMENTS

| | | |
|---|---|---|
| DE | 102013112483 | 5/2015 |
| EP | 1647751 A1 | 4/2006 |
| EP | 2009523 | 12/2008 |
| EP | 2511737 A1 | 10/2012 |
| EP | 2808706 A1 | 12/2014 |
| EP | 2843447 A1 | 3/2015 |
| EP | 2975434 A1 | 1/2016 |

OTHER PUBLICATIONS

European Patent Office, "Communication pursuant to Article 94(3), Examination Report", application No. 17193368.2, EPO, dated Sep. 30, 2021, 7 pages.

* cited by examiner

OPTOELECTRONIC SENSOR HAVING PLUG-IN UNIT FOR PROVIDING EXTENDED FUNCTIONALITY

CROSS-REFERENCE TO RELATED APPLICATIONS

This application claims priority to European Application No. EP 17 193 368.2, filed Sep. 27, 2017, the entire contents of which is incorporated herein by reference.

BACKGROUND INFORMATION

The present invention relates to an optoelectronic sensor that can be used with light curtains, in particular safety light curtains, for monitoring a protective field. Furthermore, the present invention relates to a method of operating such an optoelectronic sensor. The present invention may also provide the possibility of upgrading firmware via a wireless interface. Moreover, a communication path can be established from one light curtain system to another (neighboring) light curtain system, thus building a network, in particular a cloud or mesh of sensors.

Generally, light curtains detect the movement or intrusion of objects into guarded zones, and more particularly, provide protection for human operators who are working with machines or other industrial equipment. But also apart from safety applications, light curtains can be used for monitoring defined areas, such as for switching on/off lighting, opening doors etc. Light curtains are also used in the automation area for measurement of a height or position within a defined range. Applications in the field of material handling, like overhang and overstand detection, are possible as well.

Light curtains employing infrared or visible light beams are used to provide operator safety in a variety of industrial applications. Light curtains typically are employed for operator protection around machinery, such as punch presses, brakes, molding machines, automatic assembly equipment, coil winding machinery, robot operation, casting operations and the like. Conventional light curtains typically employ light emitting diodes (LED) mounted at spaced positions along a transmitter bar at one side of the guard zone and phototransistors (PT), photodiodes or photoreceivers mounted along a receiver bar at the opposite side of the zone. The LEDs transmit modulated infrared light beams along separate parallel channels to the PTs at the receiver bar. If one or more beams are blocked from penetration by an opaque object, such as the operator's arm, a control circuit shuts down the machine, prevents the machine from cycling, or otherwise safeguards the area.

Usually, safety light curtains comprise two optical units (called bars, sticks, or strips), which are formed as two different constructional units, one of the optical units having the functionality of an emitter and one of a receiver. Alternatively, a bidirectional optical communication between the optical units may also take place, as this is shown in EP 2511737 A1.

For many applications, in particular those which are safety related, it is important that the optoelectronic sensor does not fail during operation. Of course, also in non-safety applications it might also be very important to have this information (e. g. prognostic information) because a process stop might cause a lot of material loss. It is known that alerts are given, once the failure has occurred. However, if the failure already happened, a considerable time span can elapse while the optoelectronic sensor causes a costly shutdown of the monitored equipment or even puts personnel at risk. Consequently, it would be desirable to know about impending causes of failure and malfunction well ahead of an actual breakdown. Of course, also in non-safety applications it might also be very important to have this information (e. g. prognostic information) because a process stop might cause a lot of material loss.

The object underlying the present invention is to provide an optoelectronic sensor and a method of operating an optoelectronic sensor which reduces the risk of unexpected failure and nevertheless is robust, can be fabricated in a particularly cost-effective way, and is compatible with existing light curtain assemblies.

BRIEF DESCRIPTION

This object is solved by the subject matter of the independent claims. Advantageous embodiments of the present invention are the subject matter of the dependent claims.

The present invention is based on the idea that an optoelectronic sensor which is equipped with a diagnostic unit with wireless communication means can provide information on the status of the optoelectronic sensor along with a prognosis regarding essential operation characteristics. Accordingly, the risk of any unexpected failure can be reduced and a replacement or maintenance can be scheduled for convenient times. In particular, an optoelectronic sensor according to the present invention comprises at least one first optical unit comprising at least one radiation emitting element and at least one radiation receiving element, and a control unit for processing an output signal generated by said radiation receiving element and for generating a defined sensor signal based on the output signal. The at least one first optical unit has a diagnostic unit, wherein the diagnostic unit comprises a monitoring unit that is operable to monitor at least one parameter indicative of an operational status of the optical unit, and wherein the diagnostic unit comprises a processing unit that is operable to generate a communication signal indicative of said operational status. The diagnostic unit is arranged in a separately housed, detachable plug-in module and wherein said processing unit comprises a wireless communication interface for wirelessly receiving and transmitting communication signals.

The advantage of this solution can be seen in providing means for assessing the status of an optoelectronic sensor and predicting probable causes of failure or reasons for maintenance without having to dismantle or even directly access the optoelectronic sensor. Furthermore, any existing design can easily be retrofitted with such a diagnostic unit. Furthermore, a firmware upgrade may advantageously be performed via the wireless communication interface.

According to an advantageous embodiment of the present invention, the monitoring unit is operable to monitor at least one parameter indicative of an expected remaining operational life time of the optical unit, and wherein the processing unit is operable to generate a first alert message if the monitored parameter indicates that the remaining operational lifetime is below a defined lifetime threshold value. A parameter that can be detected as being indicative of the expected remaining operational life time is for instance the detected light intensity which is indicative of the alignment and possible contamination of the lenses. Furthermore, the current flowing through a light emitting diode (LED) forming the radiation emitter can be measured. In case this current is below a certain limit, this fact is an indicator for degradation of the LED. For LEDs, the most significant degradation parameters are the changes in brightness or color coordinates. Other parameters such as forward voltage generally play a subordinate role. During operation, LEDs experience a gradual decrease in luminous flux. As a rule, this is accelerated by the operating current and temperature of the LED and also appears when the LED is driven within specifications. Hence, also the temperature close to the LED can be used to calculate a predicted life time of an LED.

Another parameter that may be indicative of an expected remaining operational life time of the optical unit is the occurrence of electromagnetic or optical disturbance which can be measured by the diagnostic unit according to the present invention.

According to a further advantageous embodiment of the present invention, the diagnostic unit comprises a timer and a memory unit for monitoring a total time of installation and/or a time of active operation, and wherein the processing unit is operable to determine the expected remaining operational life time by comparing the total time of installation and/or a time of active operation with a maximum operational life time value stored in the memory unit. This alternative is quite simple and economic because no costly sensing and evaluation means are needed in the diagnostic unit.

As already mentioned, it is important for the optoelectronic sensor to properly function that a certain amount of radiation is received when no intruding objects are present. Consequently, the monitoring unit may be operable to monitor a radiation intensity that is received at the at least one radiation receiving element, and wherein the processing unit is operable to generate a second alert message is generated if the radiation intensity is below a defined intensity threshold value.

The advantages of the present invention can be used to full capacity with optoelectronic sensors that further comprise at least one second optical unit, wherein said radiation emitting elements are arranged on one or both of the optical units and are operable to form a plurality of radiation barriers with opposing radiation receiving elements of the respective other optical unit, and wherein the control unit is operable to generate said sensor signal upon interruption of at least one of the radiation barriers. In this case, e. g. a particularly easy monitoring of a received radiation intensity can be performed, correlating the detected radiation with a drive current at the emitter. The term "radiation barrier" is intended to signify a radiation beam which may be interrupted upon intrusion of an object into the sensing field.

The plug-in unit is in particular advantageous with such an optoelectronic sensor if the at least one first optical unit has a plurality of radiation emitting elements and radiation receiving elements, and the at least one second optical unit has a plurality of radiation emitting elements and radiation receiving elements, wherein said first and second optical unit each comprise a transceiver unit carrying said plurality of radiation emitting elements and radiation receiving elements. The first and second transceiver units may for instance have an identical structure, thus reducing the complexity and costs of the optoelectronic sensor.

Furthermore, the processing unit may be operable to monitor an amount of interruptions of at least one radiation barrier, and to generate a third alert message if the absolute amount of interruptions and/or the amount of interruptions within a defined time span exceed a predefined interruption threshold value. Such an increased amount of interruptions may be an indication of a malfunction of the optoelectronic sensor, if other reasons can be excluded.

According to a further advantageous improvement, the processing unit is operable to monitor an effective interrupted area of a protective field by said radiation barriers, to compare the effective interrupted area with a blanking area, and to generate a fourth alert message if a tolerance of the blanking area and/or any other blanking parameter exceeds a predetermined tolerance range. In this manner, the diagnostic unit is able to provide information on the operational status of the optical sensor as a whole without necessarily having to directly access the site where the sensor is mounted.

According to a further advantageous embodiment, the processing unit is operable to monitor electromagnetic and/or optical interferences, and to generate a fifth alert message if the electromagnetic and/or optical interference is above a defined interference threshold value. Such interferences can impair the proper functioning of the optoelectronic sensor and are advantageously monitored to ensure the faultless operation of the sensor.

The plug-in module according to the present invention is equipped with a wireless communication interface, so that it is not necessary that an operator approaches and dismounts the optoelectronic sensor for gaining access to its operational status information. Any suitable wireless communication technology may be used for the wireless communication interface according to the present invention. For example, the wireless communication interface may be operable to receive and transmit said communication signals via a Bluetooth communication link and/or a Connection Gateway (accesspoint) to any local area network (LAN), wide area network (WAN) or other wired network and/or a near field communication (NFC) link.

The present invention further relates to a corresponding method of operating an optoelectronic sensor for monitoring a protective field, said optoelectronic sensor comprising at least one first optical unit comprising at least one radiation emitting element and at least one radiation receiving element, a control unit for processing an output signal generated by said radiation receiving element and for generating a defined sensor signal based on the output signal, and a diagnostic unit, wherein said diagnostic unit is arranged in a separately housed, detachable plug-in module with a wireless communication interface for wirelessly receiving and transmitting communication signals. The method comprises the following steps: monitoring at least one parameter indicative of an operational status of the optical unit, and generating a communication signal indicative of said operational status.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
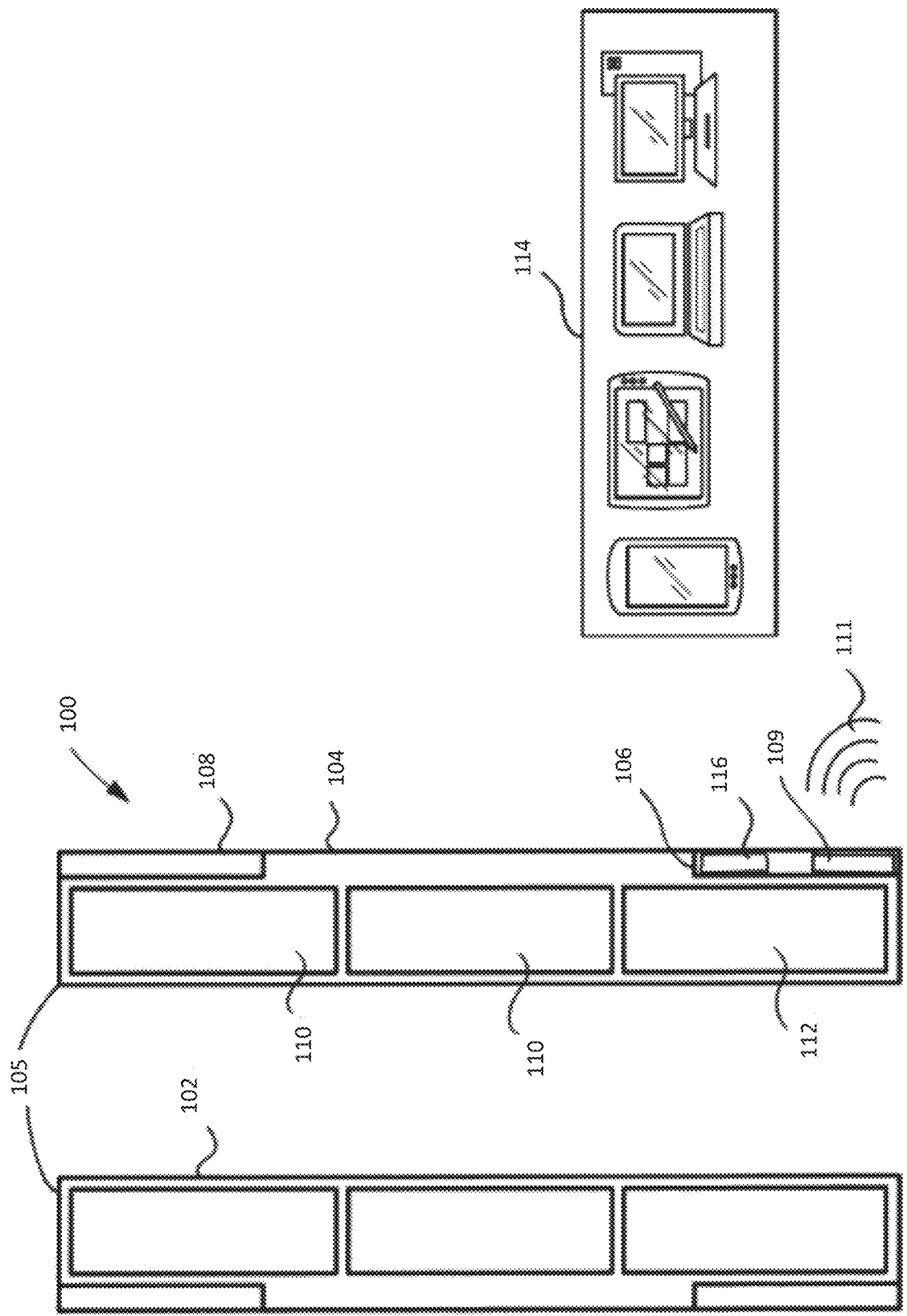
FIG. 1 shows a schematic representation of an optoelectronic sensor according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Referring now to FIG. 1, a schematic representation of an optoelectronic sensor formed by a light curtain 100 is shown which comprises two opposing optical units 105 (also referred to as rails, bars, or sticks). Of course, the ideas of the present invention are also applicable in systems which comprise only one optical unit 105 that e. g. interacts with an opposing reflective element (not shown in the Figures), or more than two optical units. In case of an optical sensor, the reflective element might also be just a reflective material (any material, also part of the machine, not a specific element). The present invention may also be used with any optical sensor like a camera, which might be active (i. e. sending light, for instance pulsed light) or passive (i. e. just receive ambient light).

The first optical rail 102 and the second optical rail 104 form between each other a plurality of light barriers for monitoring a protective field.

The optical units 105 may for instance be formed according to the principles of the European patent application EP 2511737 A1, and may in particular use plug-in modules 106, 108 for defining their respective functionality. However, according to the present invention, also optical units which are not identically built can be used advantageously. For instance, the optical units belonging to opposing optical rails 102, 104 can be configured in a way that a light emitting element arranged in one optical rail opposes a light receiving element in the other optical rail. In this case, the light barriers extend essentially at right angles to a longitudinal axis of the optical rails.

According to the embodiment shown in FIG. 1, each optical unit 105 comprises two identical modules 110 each having light emitting and light receiving elements. These optical modules 110 may be identically built for all optical units 105. Each of the optical units 105 further comprises at least one second optical module 112 that additionally comprises a micro controller providing the necessary intelligence to the optical unit 105. Each of the modules 110, 112 may for instance have a height of about 150 mm. However, any other size or number of modules within each optical unit 105 can also be used together with the present invention. Essentially, the first and second optical units 105 are identically built except for the plug-in modules 106, 108 which are defining the particular functionality of each of the optical units, and will be described in more detail below.

Each of the optical modules 110 may comprises a plurality of transceiver elements with their associated circuitry for emitting and sensing the radiation beams. The second optical module 112 contains the same optical functions and, additionally, at least one micro controller and optionally electronic circuitry, such as an interface with an external connector. However, for using the ideas according to the present invention, the transceiver elements of course do not necessarily have to be grouped in optical modules 110, 112.

According to one embodiment of the present invention, one or both of the optical units 105 comprise a wireless communication interface 109 for wirelessly receiving and transmitting communication signals 111. The wireless communication interface 109 is for instance a part of the first plug-in module 106. The wireless communication interface 109 allows a wireless communication with computing devices 114. The computing device 114 may include a mobile device, a tablet device, a laptop, a general purpose computer, or the like.

According to embodiments of the present invention, the plug-in module 106 may further comprise a diagnostic unit 116 which is operable to monitor at least one parameter indicative of an operational status of the optical unit. The diagnostic unit 116 comprises a processing unit that is operable to generate a communication signal 111 indicative of said operational status.

There are many parameters that may be monitored according to various embodiments of the present invention. As mentioned above, the diagnostic unit 116 may for instance comprise a monitoring unit that is operable to monitor at least one parameter indicative of an expected remaining operational life time of the optical unit. The processing unit is operable to generate a first alert message if the monitored parameter indicates that the remaining operational lifetime is below a defined lifetime threshold value. The expected remaining operational life time of the optical unit may for instance just be derived from the time span, in which the optical unit has been in active operation. Additionally, or alternatively, an installation date or a manufacturing date may also be stored in the monitoring unit and may be compared to a current date provided by a timer or from external sources in order to calculate the expired life time. This expired life time can be compared to a stored value indicating a maximum operational life time of the optical unit 105. When the expected remaining operational life time equals or exceeds the maximum operational life time, a corresponding alert message may be generated and transmitted to the computing device 114. Alternatively, or additionally, the remaining operational lifetime may also be reported continuously or after defined intervals. Monitoring the expected remaining operational lifetime avoids an exchange or maintenance of the optoelectronic sensor at critical instances because the necessary exchangeable maintenance may be planned ahead taking into account also other factors.

According to further advantageous embodiments, the radiation intensity which is received at the at least one radiation receiving element is monitored. The processing unit generates an alert message in case that the measured radiation intensity is below a defined intensity threshold value. The radiation intensity is in particular an indication of a contamination of lenses and/or transparent covers of the optical units. Furthermore, the measured radiation intensity may also decrease due to a degradation of the emitter intensity. For instance, light emitting diodes (LED) are known to lose radiation output intensity when they are approaching the end of their operational lifetime.

According to further advantageous embodiments, also parameter of the light curtain as such may be monitored by the diagnostic unit 116. For instance, an effective interrupted area of a protective field may be monitored and compared with a blanking area. An alert message may be generated and be transmitted wirelessly to the computing device 114 if the tolerance of the blanking area exceeds a predetermined tolerance range. Of course, also other blanking parameters may be monitored and compared to a predetermined tolerance range.

Another example of an important operational parameter is the presence of interferences. The diagnostic unit 116 may accordingly be operable to monitored occurring electromagnetic and/or optical interferences. In case that these interferences exceed a predefined and the word interference threshold value, and other alert message may be generated and transmitted via the wireless communication link 111 to the computing device 114.

According to embodiments of the present invention, the communication link 111 may be based on wireless communication links such as a Bluetooth® communication link and/or a Connection Gateway (accesspoint) to any local area network (LAN), wide area network (WAN) or other wired network and/or a near field communication (NFC) link, or the like. It is clear for a person skilled in the art, that any suitable wireless connection may be used.

Figure 2:
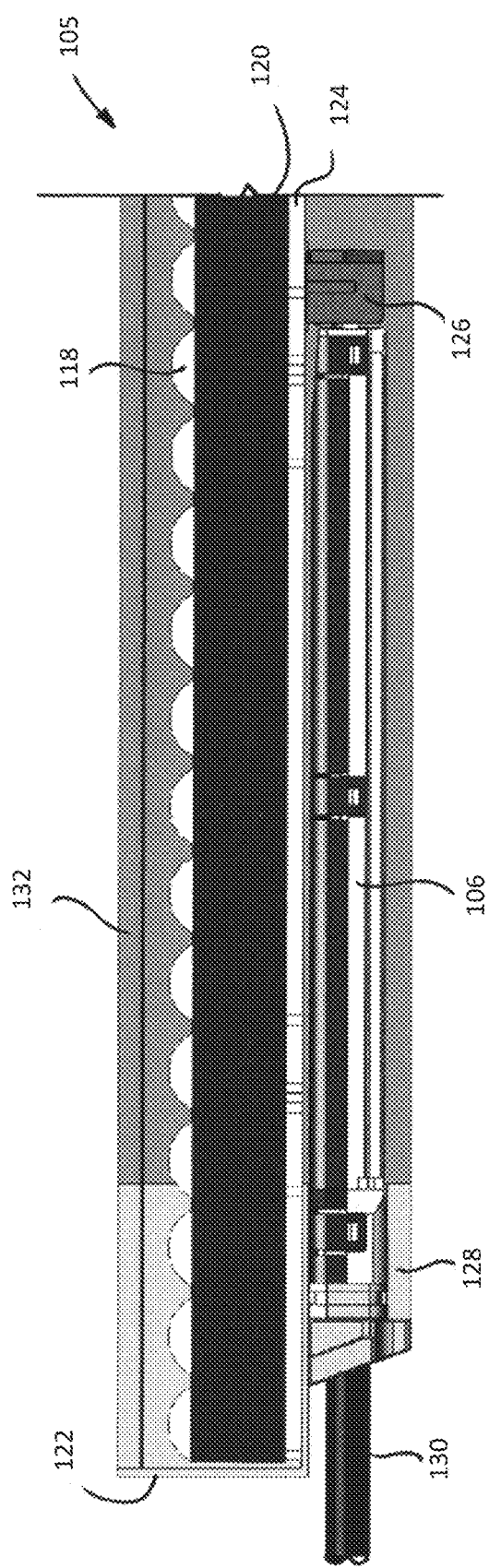
FIG. 2 shows a schematic sectional view of an optical unit according to a first embodiment of the present invention.

FIG. 2 shows a schematic longitudinal cross section of an optical unit 105 according to the present invention. A plurality of transceiver elements 118 which are covered with lenses comprise each a light emitting element and a light receiving element (not visible in the Figures). The transceiver elements 118 are arranged in a module housing 120, the module housing 120 being mounted inside a support element 122. The optical module comprises a printed circuit board (PCB) 124, wherein the transceiver elements 118 are arranged on a first surface of the printed circuit board. A transparent cover 132 protects the transceiver elements 118 and the electronic components against the intrusion of dust and humidity.

According to the present invention, the optical unit 105 comprises a plug-in module 106 that is connected to the PCB 124 via a connector receptacle 126. The plug-in module 106 is mechanically fixed between the connector receptacle 126 and a mounting unit 128. A cable 130 allows the connection of the plug in module 106 to e. g. a power source or a communication bus. The plug-in module 106 comprises a wireless communication interface and a diagnostic unit for performing the operations explained with reference to FIG. 1. Advantageously, the support element 122 is transmissible for electromagnetic radiation at least close to the antenna needed for the wireless communication.

Figure 3:
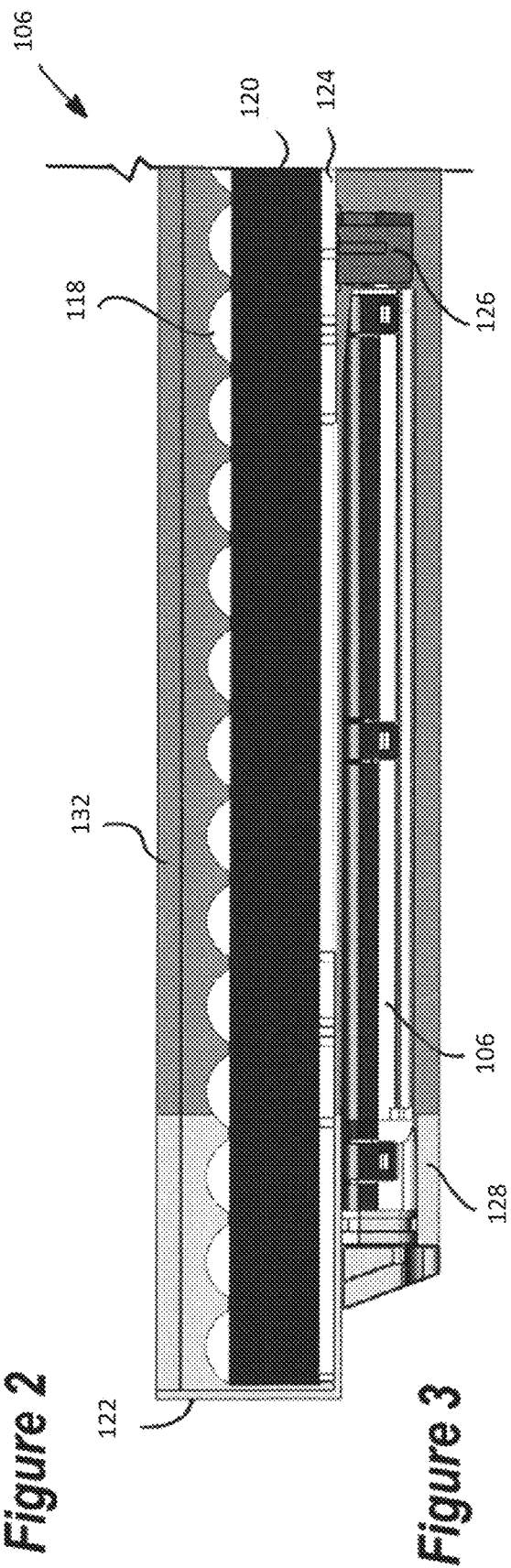
FIG. 3 shows a schematic sectional view of an optical unit according to a second embodiment of the present invention.

FIG. 3 shows an embodiment where no cable 130 is provided. A power cable 130 is unnecessary, in case the electric power is provided via the wireless communication interface together with the communication signal. Alternatively, a power cable may be attached to the second plug in module 108 (shown in FIG. 1). In this case, the plug-in module 105 is powered via the connector receptacle 126.

Figure 4:
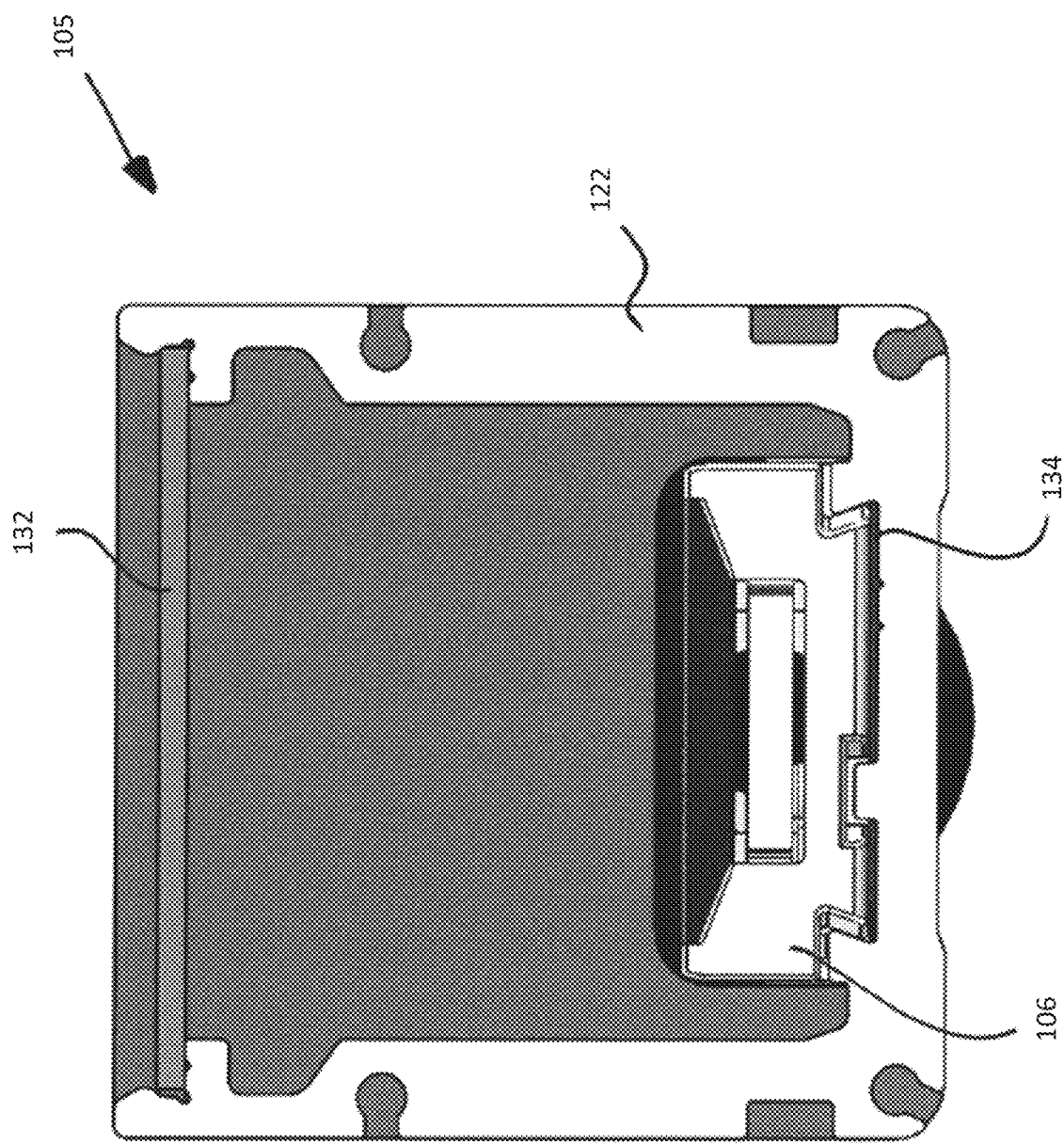
FIG. 4 shows a schematic sectional view of the optical unit according to FIG. 2 or 3.

FIG. 4 shows a further schematic cross sectional view of the optical unit 105 according to either FIG. 2 or 3 (the optical module 110 is not shown for the sake of clarity). The support element 122 comprises an extruded U-shaped profile, which may for instance be fabricated from aluminium. The plug-in module 106 is held in a dovetail groove 134 provided at the support element 122. Due to the transparent cover 132 not being electrically conductive, it does not screen electromagnetic radiation to be emitted from/received by the wireless communication interface of the plug-in module 106.

Figure 5:
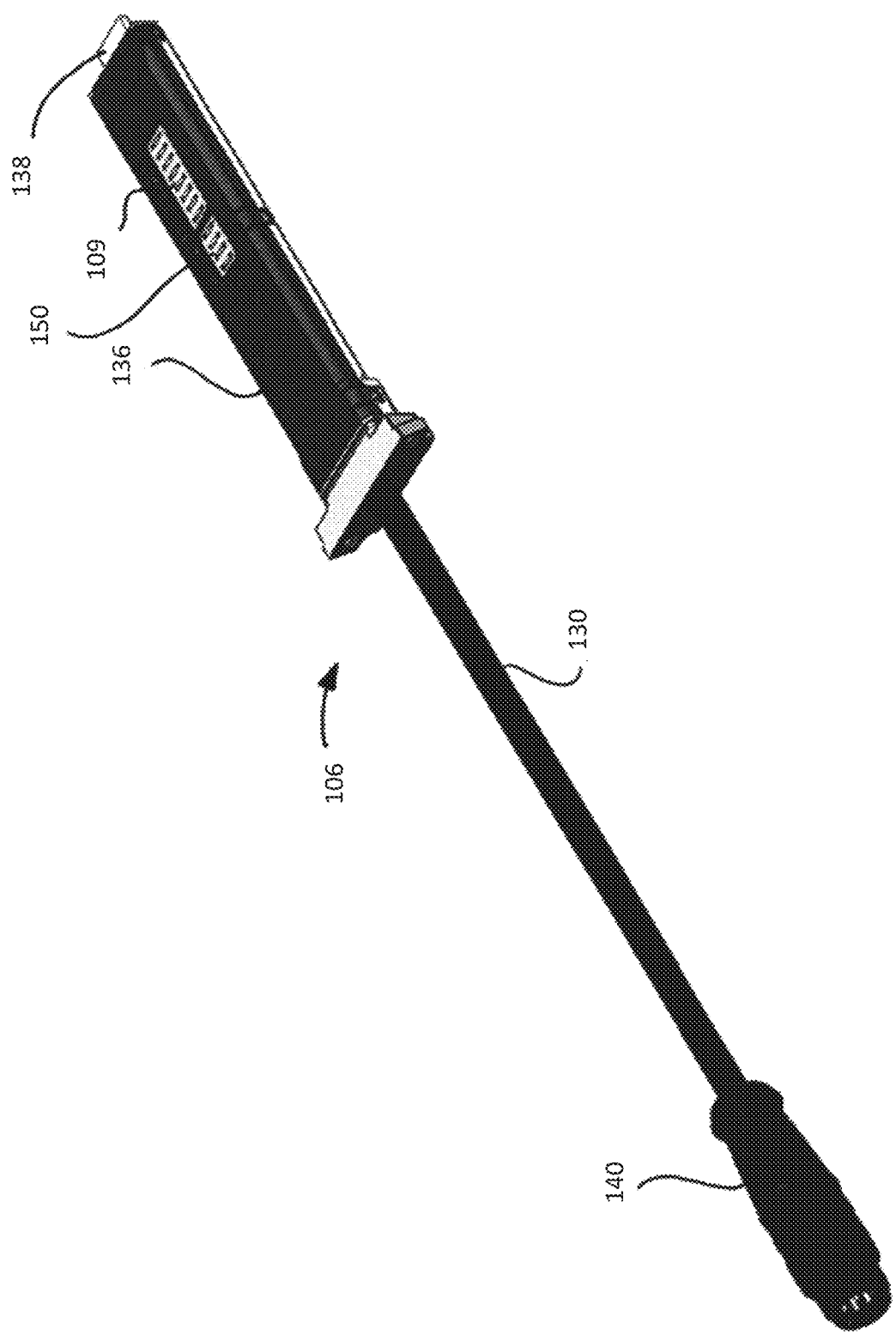
FIG. 5 shows a perspective view of a plug-in unit according to the present invention.

FIG. 5 shows the plug-in module 106 of FIG. 2 in a perspective representation. According to the exemplary embodiment shown in FIG. 5, the plug-in module 106 comprises a housing 136 which surrounds the electronic components of the plug-in module 106. In particular, the plug-in module 106 may comprise a wireless communication interface, e. g. a Bluetooth® processor as well as An electrical connector 138 is provided for being electrically connected with the connector receptacle 126 provided at the printed circuit board 124. A cable 130 with an electrical plug connector 140 allows the connection to a power source and provides the output signals of the light curtain. According to an advantageous embodiment, the plug connector 140 comprises the safety outputs (OSSD) and the GPIO contacts, as well as contacts for connecting a power supply.

For the communication with the optical modules 110, 112 via the electrical connector 138, the plug-in module may comprise a serial interface, advantageously a Universal Asynchronous Receiver Transmitter (UART) interface. Of course, the specific interface depends on the communication bus that is used by the optical modules 110, 112 and can be any suitable communication interface. When dispensing with the electrical 138, also a wireless communication can be provided between the plug-in module and the optical modules 110, 112.

Figure 6:
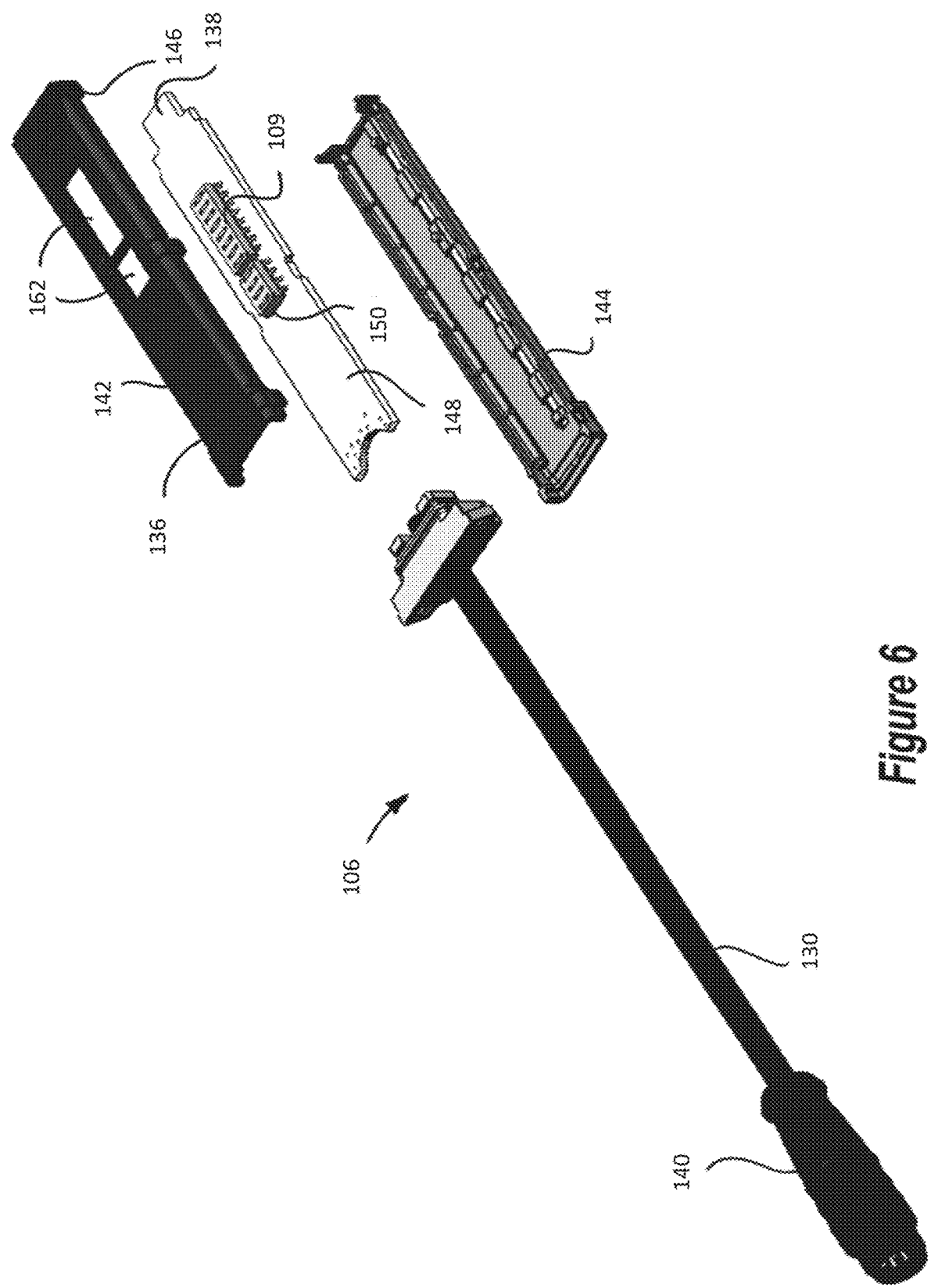
FIG. 6 shows a perspective, partly exploded view of the plug-in unit according to FIG. 5.

FIG. 6 shows a schematic partly exploded view of the plug-in module 106 shown in FIG. 5. The housing 136 comprises a first half-shell 142 and a second half-shell 144 that are fixed at each other by means of resilient latching means 146. Any other suitable locking means may of course also be used.

A plug-in PCB carries the connector 138 and the wireless communication interface component 109. Furthermore, a sensing unit 150 is arranged on the plug-in PCB 148 that is sensing parameters such as the temperature of the inside of the optical unit 105. The sensing unit 150 may also be arranged in the micro controller of the second optical module 112, providing this information to the connection plug-in module.

Two windows 152 allow an unobstructed access of the sensing unit 150 and the wireless communication interface component 109 to the outside of the first half-shell 142. For the sensing unit 150 this allows the fast detection of any elevated temperature at the PCB 124. Further, the antennas of the wireless communication interface component 109 can send and receive electromagnetic radiation through the module housing 120, the PCB 124, and the cover 132 (see FIGS. 2 and 3).

Figure 7:
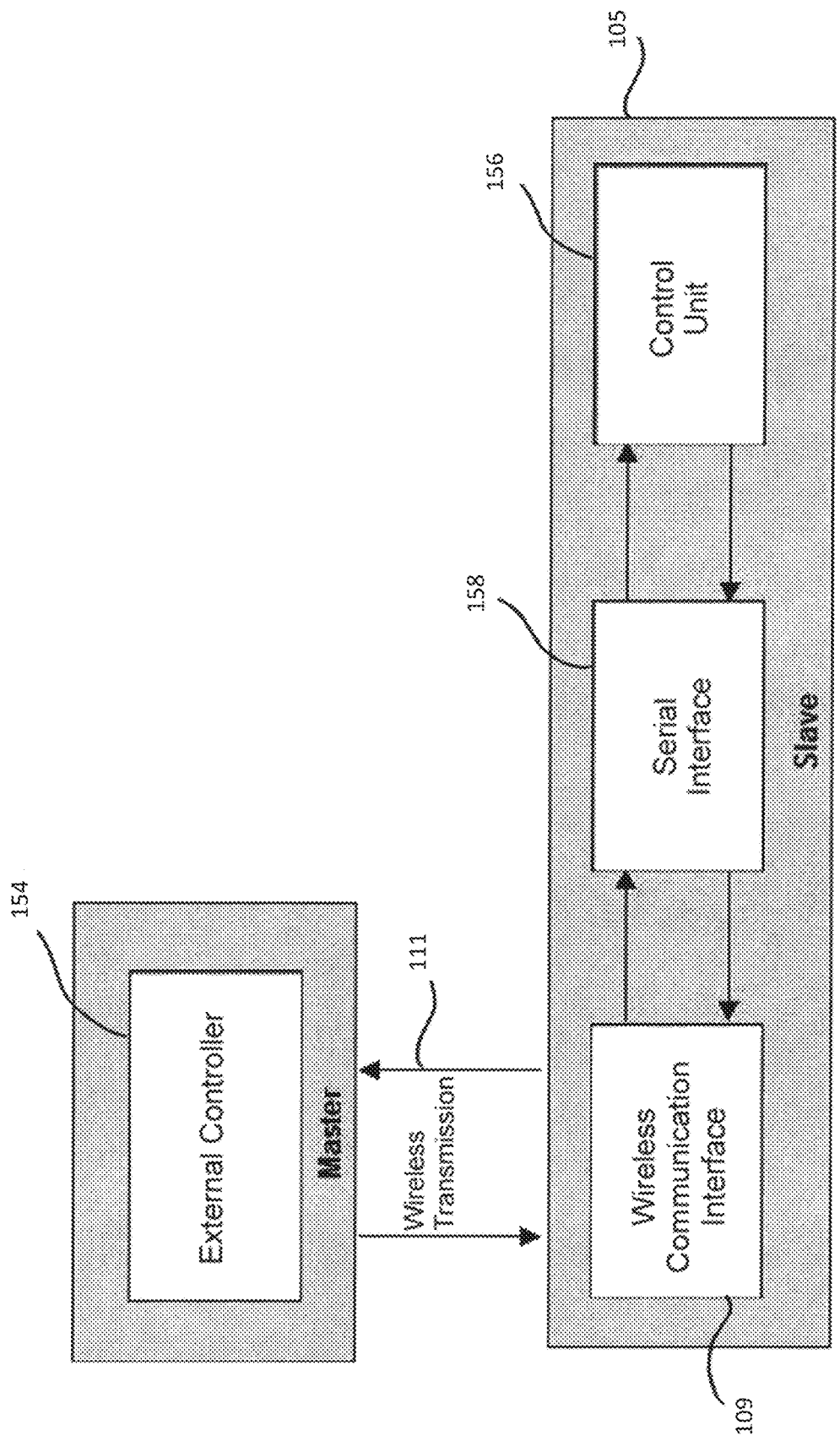
FIG. 7 shows a block diagram illustrating the communication between an optoelectronic sensor and an external controller.

FIG. 7 schematically illustrates the communication between the control unit 156 of the optical unit 105 and an external controller 154 by means of wireless communication 111. According to an exemplary embodiment, the optical unit 105 is configured as a slave and communicates with the wireless communication interface 109 via a serial interface 158. As already mentioned above, the serial interface 158 may for instance comprise a UART interface.

The external controller 154 is configured as a master for the wireless communication with the optical unit 105. The external controller 154 is part of a computing device 114 (see FIG. 1) which may include a mobile device, a tablet device, a laptop, a general purpose computer, or the like.

Figure 8:
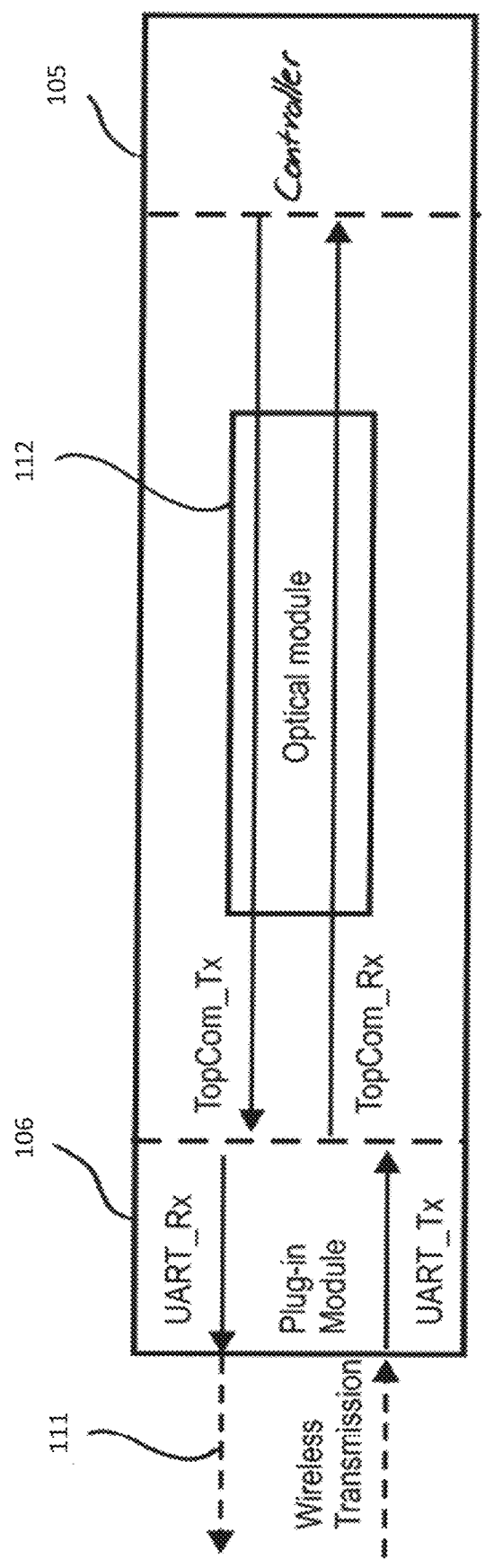
FIG. 8 illustrates the signal flow within an optical unit according to one embodiment of the present invention.

FIG. 8 illustrates the signal flow through the optical unit 105 in more detail. According to an exemplary embodiment, the optical module 112 transmits signals internally and with optional further optical modules 110 via a synchronized communication bus as indicated by the bus lines Top-Com_Tx and TopCom_Rx. Inside the plug-in module 106, these signals are processed as asynchronous serial signals UART_Rx, UART_Tx. The wireless communication link is for instance a Bluetooth® link, preferably a Bluetooth® Low Energy (BLE) link.

Figure 9:
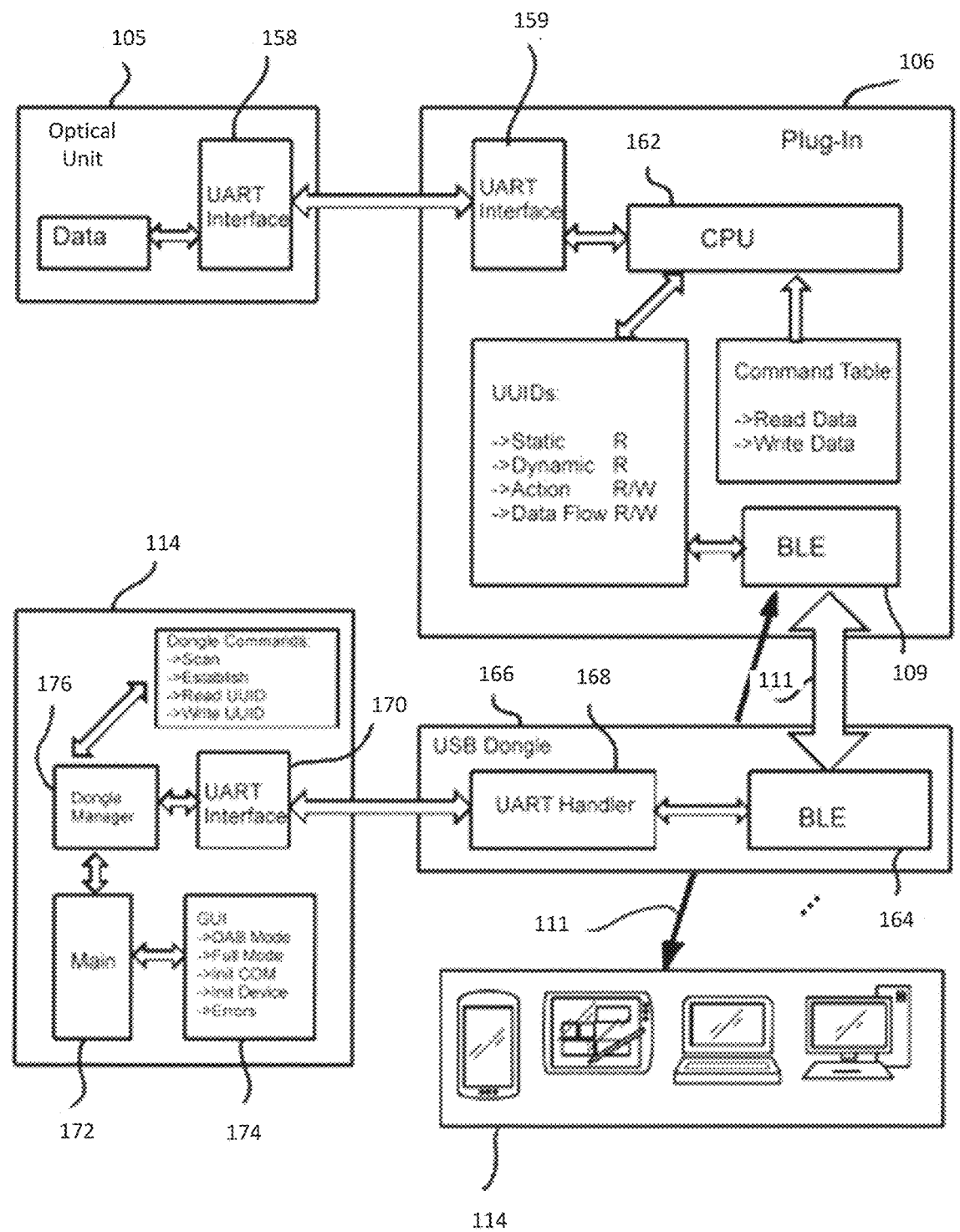
FIG. 9 shows a schematic representation of a wireless communication according to an exemplary embodiment.

FIG. 9 schematically illustrates in the form of a block diagram further exemplary embodiments of the communication scheme according to the present invention.

Data that are transmitted from/to the optical unit 105 are converted to/from an asynchronous serial format by the UART interfaces 158, 159 for the communication with the plug-in module 106. The plug-in module 106 comprises a control unit (CPU) 162 that controls the data processing and operation of the plug-in unit 106. In particular, the CPU 162 coordinates the generation and compilation of data that provide status information about the optical unit 105. Various universally unique identifiers (UUIDs) may be used for indicating different diagnostic services. For instance, a "Static" service may contain static information about the optical unit, such as product type, fabrication date, installation date, and the like. "Dynamic" services may comprise the monitoring of the temperature, of the drive current of each LED, and of the operation voltages. Furthermore, the "Dynamic" services may also comprise GPIO and OSSD signals and an error profile. An "Action" service may comprise alignment routines and a reset routine. The "Data Flow" service controls the data transmission as such.

The wireless communication interface 109 may advantageously comprise a BLE interface. According to an advantageous embodiment, the BLE interface 109 may communicate with a corresponding BLE interface 164 which is arranged in a USB dongle 166. This dongle 166 is operable to perform a conversion between USB (universal serial bus) data and BLE data. The dongle 166 can be used with any suitable computing device 114. Alternatively, or additionally, the BLE interface 109 directly communicates with interfaces that are part of the computing device 114.

When using the dongle 166, the dongle 166 advantageously comprises a UART handler 168, which enables the communication with the UART interface 170 of the computing device 114. The computing device 114 comprises a main controller 172 which also is responsible for addressing a graphical user interface 174. The graphical user interface allows displaying parameters and alert messages received from the optical unit 105 and imputing command to be executed by the optical unit 105. A dongle manager unit of the computing device 114 coordinates the communication between the main controller 172 of the computing device 114 and the USB dongle 166.

Figure 10:
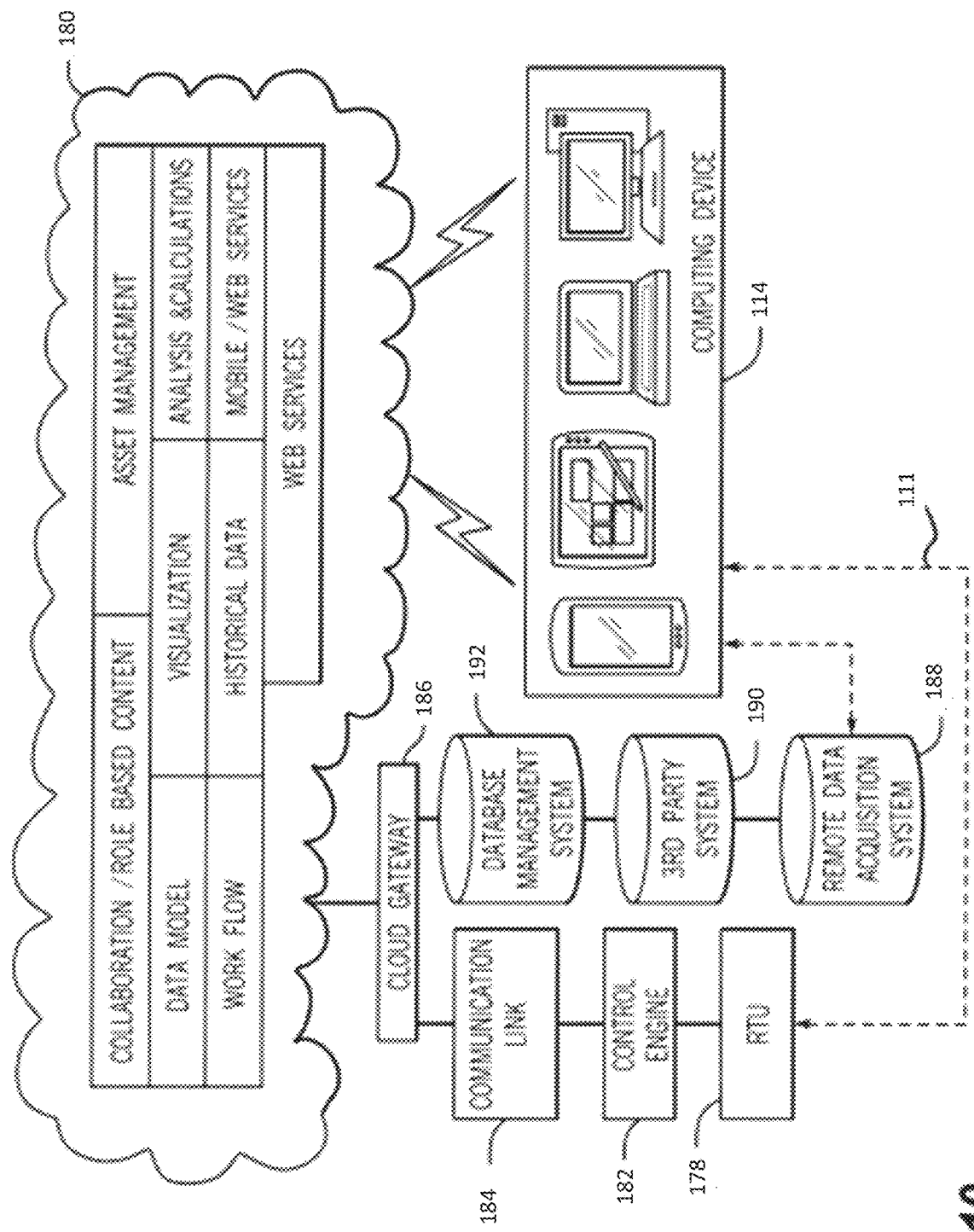
FIG. 10 shows a schematic representation of a cloud-based communication architecture as an application environment for the optoelectronic sensor according to one embodiment of the present invention.

According to a further advantageous embodiment, the optical unit 105 with a plug-in module 106 as described above may form a remote terminal unit (RTU) 178 which is part of a larger, in particular cloud-computing system. Generally, the RTUs store and execute control programs to effect decision-making in connection with a process for controlling the operation of the well device. FIG. 10 schematically depicts an exemplary system architecture comprising such an RTU 178.

In certain embodiments, the RTU 178 may establish a communication link with the cloud-based computing system 180 shown in FIG. 10. As such, the cloud-based computing system 180 may use its larger processing capabilities to analyze data acquired by multiple RTUs 26. Moreover, the cloud-based computing system 180 may access historical data associated with the respective RTU 178, data associated with devices associated with the respective RTU 178, data associated with an industrial site associated with the respective RTU 178, and the like to further analyze the data acquired by the RTU 178.

Accordingly, in one embodiment, the RTU 178 may communicatively couple to the cloud-based computing system 180 via a cloud-based communication architecture as shown in FIG. 10. Referring to FIG. 10, the RTU 178 may communicatively couple to a control engine 182 such as ControlLogix® or the like. The control engine 182 may, in turn, communicatively couple to a communication link 184 that may provide a protocol or specifications such as OPC Data Access that may enable the control engine 182 and the RTU 178 to continuously communicate its data to the cloud-based computing device 114.

The communication link 184 may be communicatively coupled to the cloud gateway 186, which may then provide the control engine 182 and the RTU 178 access to communicate with the cloud-based computing device 180. Although the RTU 178 is described as communicating with the cloud-based computing device 180 via the control engine 182 and the communication link 184, it should be noted that in some embodiments, the RTU 178 may communicate directly with the cloud gateway 186 or may communicate directly with the cloud-based computing device 114.

In some embodiments, the RTU 178 may communicatively couple to the control engine 182 or the communication link 1844 via an Ethernet IP/Modbus network. As such, a polling engine may connect to the RTU 178 via the Ethernet IP/Modbus network to poll the data acquired by the RTU 178. The polling engine may then use an Ethernet network to connect to the cloud-based computing system 180.

In addition to the RTU 178 and the control engine 182 being able to communicate with the cloud-based computing system 180, remote data acquisition systems 188, third party systems 190, and database management systems 192 may also communicatively couple to the cloud gateway 186. The remote data acquisition systems 188 may acquire real-time data transmitted by various data sources such as the RTU 178 and other third party systems 190. The database management system 192 may be a relational database management system that stores and retrieves data as requested by various software applications. By way of example, the database management system 192 may be a SQL server, an ORACLE server, a SAP server, or the like. As mentioned above, the computing device 114 may communicatively couple to the RTU 178 and the cloud-based computing system 180. As shown in FIG. 10, the computing device 114 may include a mobile device, a tablet device, a laptop, a general purpose computer, or the like. In certain embodiments, the computing device 114 may also communicatively couple with the remote data acquisition systems 188, the third party system 190, and the database management system 192. By communicating with all of these types of devices, the computing device 114 may receive data and generate visualizations associated with each respective device, thereby providing the user of the computing device 114 a more efficient manner in which to view and analyze the data.

Moreover, since the computing device 114 may receive data from the cloud-based computing system 180, the computing device 180 may receive visualizations and data related to various types of analyses and cloud services provided by the cloud-based computing system 180.

Thus, the plug-in unit according to the present invention may significantly extend the functionality of an optical unit or light curtain in its industrial environment.

In yet another embodiment, the optical unit 105 is used in a safety machine guarding application that creates a safe enclosure for a machine operator. This application is useful to perform a diagnosis and prognosis of the optical unit 105 as well as of the surrounding environment.

In this application, the external device 114 with controller 154 (as shown in FIG. 7) receives information from a safety optoelectronic device that indicates to the controller 154 of the external device 114 that an event has occurred or will/may occur. When the controller 154 of the external device 114 is able to aggregate the information received via the wireless communication link from the control unit 156, it is then able to take action such as device or system maintenance (e.g. cleaning, alignment), device or system replacement (e.g. failure may occur based on a calculation of threshold limits (e.g. number of cycles, current, voltages, received power, etc.), data change in the trajectory, which could be a sign for potential failures, or aggregation of data of multiple devices and deriving data which provide a further validation that an event has occurred (diagnostic data) or will be occurring (prognostic data).

This coordination of information is then acted upon in pre-defined ways by getting information from the cloud 180 (FIG. 10) in terms of fixing the problem. For instance, a maintenance cycle can be performed or scheduled. Furthermore, logging, trending, or documentation can be preformed and an improved solution can be presented to the user.

In addition to the above describes measured variables such as operational life time, total time of installation, radiation intensity, amount of interruptions, blanking-in tolerance, and interferences, the following additional parameters are used in light curtains and may give information for prognostic data and/or may be communicated via the wireless communication interface according to the present invention.

Firstly, various general system information can be evaluated for deriving diagnostic data, for instance a prognosis about the expected remaining operational life. The general system information may for instance comprise the number of beams, their resolutions, response time, the hardware configuration, such as details on the installed plug-in units, a number of cascades, current configuration parameters, software and hardware version, incl. date of software update, stick catalog number, Unique Stick ID, production date, and the like.

Furthermore, the receiver signal amplitude can be evaluated for at least one of the radiation receivers. The signal amplitude may be also an indication of dirty front window or bad alignment of the sensor.

When starting up and/or resetting a sensor, e. g. a light curtain, a teach-in procedure is usually performed. Consequently, a teach-in counter may be provided which counts how many times the light curtain was taught since it was first installed.

Moreover, diagnostic information may be collected for a muting application. For instance, the current measured muting times, the times too close to a given limit, and/or any muting faults may be monitored and evaluated.

Furthermore, the error and lockout history, i. e. the information about the last fault (or a given number of past faults) that occurred, and/or the switch-off history, i. e. the information about the reasons for the most recent switch-off (or a given number of past switch-offs) may be monitored, stored and evaluated.

Moreover, the status of each individual beam e. g. on, off, and/or the intensity of every single beam, may be monitored and evaluated to provide diagnostic data on the light curtain as a whole.

A further important parameter to be monitored may be the internal temperature, including its maximum and minimum values, which may provide an indication of increased aging if the device is running all the time in a high temperature range.

Finally, also the internal and supply voltages may be monitored and evaluated for generating diagnostic data.

In addition to the wireless connection, the optoelectronic sensor may also communicate via wired interfaces, such as like Ethernet IP, Guardlink and others. In addition, the light curtains may build a local mesh/cloud network signaling the status to each other and one of the light curtains is connected to the network and feeds the collected information through an interface (wired or wireless) to a higher level network. As already mentioned, the firmware may easily be modified, in particular be upgraded, via the wireless communication interface.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i. e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein, is intended merely to better illuminate the invention and does not pose a limitation on the scope of the invention unless otherwise claimed. No language in the specification should be construed as indicating any non-claimed element as essential to the practice of the invention.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An optoelectronic sensor for monitoring a sensing field, said optoelectronic sensor comprising:
   at least one first optical unit comprising at least one radiation emitting element and at least one radiation receiving element,
   a control unit for processing an output signal generated by said radiation receiving element and for generating a defined sensor signal based on the output signal,
   wherein the at least one first optical unit has a diagnostic unit, wherein the diagnostic unit comprises a monitoring unit that is operable to monitor at least one parameter indicative of an operational status of the optical unit, and wherein the diagnostic unit comprises a processing unit that is operable to generate a communication signal indicative of said operational status, and
   wherein said diagnostic unit is arranged in a separately housed, detachable plug-in module and wherein said processing unit comprises a wireless communication interface for wirelessly receiving and transmitting communication signals, wherein the diagnostic unit is configured to monitor at least one of a total time of installation and a time of active operation, wherein the processing unit is operable to determine an expected remaining operational life time of the optical unit using at least one of the total time of installation and the time of active operation.

2. The optoelectronic sensor according to claim 1, wherein the monitoring unit is operable to monitor at least one parameter indicative of the expected remaining operational life time of the optical unit, and wherein the processing unit is operable to generate a first alert message when the monitored parameter indicates that the remaining operational lifetime is below a defined lifetime threshold value.

3. The optoelectronic sensor according to claim 1, wherein the diagnostic unit comprises a timer and a memory unit for monitoring at least one of the total time of installation and the time of active operation, and wherein the processing unit is operable to determine the expected remaining operational life time by comparing at least one of the total time of installation and the time of active operation with a maximum operational life time value stored in the memory unit.

4. The optoelectronic sensor according to claim 1, wherein the monitoring unit is operable to monitor a radiation intensity that is received at the at least one radiation receiving element, and wherein the processing unit is operable to generate an alert message when the radiation intensity is below a defined intensity threshold value.

5. The optoelectronic sensor according to claim 1, further comprising at least one second optical unit operable to form a plurality of radiation barriers with the first optical unit, and wherein the control unit is operable to generate said sensor signal upon interruption of at least one of the radiation barriers.

6. The optoelectronic sensor according to claim 5, wherein:
   the at least one first optical unit has a plurality of radiation emitting elements and a plurality of radiation receiving elements,
   the at least one second optical unit has a plurality of radiation emitting elements and a plurality of radiation receiving elements, and
   said first and second optical unit each comprise a transceiver unit carrying said plurality of radiation emitting elements and radiation receiving elements.

7. The optoelectronic sensor according to claim 5, wherein the processing unit is operable to monitor an amount of interruptions of at least one radiation barrier, and to generate an alert message when one of an absolute amount of interruptions and an amount of interruptions within a defined time span exceeds a predefined interruption threshold value.

8. The optoelectronic sensor according to claim 5, wherein the processing unit is operable to monitor an effective interrupted area of a sensing field by said radiation barriers, to compare the effective interrupted area with a blanking area, and to generate an alert message when a tolerance of one of the blanking area and another blanking parameter exceeds a predetermined tolerance range.

9. The optoelectronic sensor according to claim 5, wherein the processing unit is operable to monitor one of an electromagnetic interference and an optical interference and to generate an alert message when one of the electromagnetic interference and the optical interference is above a defined interference threshold value.

10. The optoelectronic sensor according to claim 1, wherein the wireless communication interface is operable to receive and transmit said communication signals via one of a Bluetooth® communication link, a Connection Gateway to a wired network, and a near field communication (NFC) link.

11. A method of operating an optoelectronic sensor for monitoring a sensing field, said optoelectronic sensor comprising at least one first optical unit comprising at least one radiation emitting element and at least one radiation receiving element, a control unit for processing an output signal generated by said radiation receiving element and for generating a defined sensor signal based on the output signal, and a diagnostic unit, wherein said diagnostic unit is arranged in a separately housed, detachable plug-in module with a wireless communication interface for wirelessly receiving and transmitting communication signals,
   wherein the method comprises the following steps:
   monitoring at least one parameter indicative of an operational status of the optical unit, and
   generating a communication signal indicative of said operational status, wherein the operational status comprises an expected remaining operational life time of the sensing unit.

12. The method according to claim 11, wherein a first alert message is generated when the monitored parameter indicates that the remaining operational lifetime is below a defined lifetime threshold value.

13. The method according to claim 12, wherein the diagnostic unit comprises a timer and a memory unit for monitoring at least one of a total time of installation and a time of active operation, and wherein the processing unit is operable to determine the expected remaining operational life time by comparing at least one of the total time of installation and the time of active operation with a maximum operational life time value stored in the memory unit.

14. The method according to claim 11, wherein said operational status comprises a radiation intensity that is received at the at least one radiation receiving element and wherein an alert message is generated when the radiation intensity is below a defined intensity threshold value.

15. The method according to claim 11, wherein:
the optoelectronic sensor further comprises at least one second optical unit operable to form a plurality of radiation barriers with the first optical unit,
an amount of interruptions of at least one radiation barrier is monitored, and
an alert message is generated when one of an absolute amount of interruptions and an amount of interruptions within a defined time span exceeds a predefined interruption threshold value.

16. The method according to claim 15, wherein an effective interrupted area of a sensing field monitored by said radiation barriers is compared with a blanking area, and wherein an alert message is generated when a tolerance of one of the blanking area and another blanking parameter exceeds a predetermined tolerance range.

17. The method according to claim 11, wherein one of an electromagnetic interference and an optical interference is monitored, and wherein an alert message is generated when one of the electromagnetic interference and the optical interference is above a defined interference threshold value.

18. The method according to claim 11, wherein the communication signals are received and transmitted via one of a Bluetooth communication link, a Connection Gateway to a wired network, and a near field communication (NFC) link.

19. An optoelectronic sensor for monitoring a sensing field, said optoelectronic sensor comprising:

at least one first optical unit comprising at least one radiation emitting element and at least one radiation receiving element,
a control unit for processing an output signal generated by said radiation receiving element and for generating a defined sensor signal based on the output signal,
wherein the at least one first optical unit has a diagnostic unit, wherein the diagnostic unit comprises a monitoring unit that is operable to monitor at least one parameter indicative of an operational status of the optical unit, and wherein the diagnostic unit comprises a processing unit that is operable to generate a communication signal indicative of said operational status, wherein the monitoring unit is operable to monitor at least one parameter indicative of an expected remaining operational life time of the optical unit, and
wherein said diagnostic unit is arranged in a separately housed, detachable plug-in module and wherein said processing unit comprises a communication interface for receiving and transmitting communication signals.

20. The optoelectronic sensor according to claim 19, wherein the processing unit is operable to generate a first alert message when the monitored parameter indicates that the remaining operational lifetime is below a defined lifetime threshold value.

* * * * *